United States Patent

Marzocchi et al.

[11] Patent Number: 6,044,940
[45] Date of Patent: Apr. 4, 2000

[54] REMOTE-CONTROLLED HYDROPNEUMATIC SHOCK ABSORBER

[75] Inventors: Paolo Marzocchi, Bologna; Loris Vignocchi, Zola Predosa; Sandro Musiani, Marzabotto, all of Italy

[73] Assignee: Marzocchi S.p.A., Zola Predosa, Italy

[21] Appl. No.: 08/967,961

[22] Filed: Nov. 12, 1997

[30] Foreign Application Priority Data

Nov. 13, 1996 [IT] Italy ................................ BO960155 U

[51] Int. Cl.$^7$ ........................................................ F16F 9/46
[52] U.S. Cl. .................................... 188/299.1; 188/319.1; 188/322.5; 267/64.16
[58] Field of Search .......................... 188/297, 299.1 OR, 188/283, 288, 289, 313, 312, 316, 318, 319.1, 322.15, 322.22, 282.1, 282.6, 282.9; 267/64.16, 64.28, 64.22, 64.25

[56] References Cited

U.S. PATENT DOCUMENTS

| | | | |
|---|---|---|---|
| 3,854,710 | 12/1974 | Nicholls | 267/64.25 |
| 5,303,804 | 4/1994 | Spiess | 188/322.15 |
| 5,320,375 | 6/1994 | Reeves et al. | 188/282.1 |
| 5,348,112 | 9/1994 | Vaillancourt | 267/64.16 |
| 5,505,281 | 4/1996 | Lee | 188/299.1 |
| 5,738,191 | 4/1998 | Forster | 188/318 |

Primary Examiner—Paul N. Dickson
Assistant Examiner—Thomas J. Williams
Attorney, Agent, or Firm—King and Schickli, PLLC

[57] ABSTRACT

A shock absorber comprises a sliding tube sealed at one end which is provided with an attachment for one of the two parts of the vehicle which needs cushioning and a stem presenting at one end another attachment for the other of the two parts of the vehicle and at the other end a piston engaged within the sliding tube to make a sliding side seal with the tube. The piston is equipped with valve means controlling the flow of a liquid between first and second pressure chambers formed within the sliding tube by the opposed faces of the piston. The first pressure chamber is traversed by the stem. The stem is provided with a longitudinal duct which through radial ports is communicating with the first chamber and which communicates with the second chamber through a sized end hole with which the tip of the needle of a variable throttle cooperates. The other end of the throttle presents a thickened head engaged within a portion of the duct of the stem to make a sliding side seal, the duct being filled with liquid and connected with a pressure chamber of a remote control device. The pressure chamber is of the hydraulic cylinder and piston type whereby it is possible by axial displacement of the cylinder to change the axial position of the needle of the throttle and therefore also the size or gap of the end hole of the throttle in order to modify the shock absorber braking force.

8 Claims, 3 Drawing Sheets

REMOTE-CONTROLLED HYDROPNEUMATIC SHOCK ABSORBER

SUMMARY OF THE INVENTION

The present invention relates to a hydropneumatic shock absorber for vehicles, and preferably for bicycles and motorcycles provided with a device for the remote control of the braking adjustment of the stroke of the shock absorber.

BRIEF DESCRIPTION OF THE DRAWINGS

The features of the present invention and the advantages deriving from it will be apparent from the following description which makes reference to the figures of the attached drawings, in which.

DETAILED DESCRIPTION OF THE INVENTION

Figure 1:
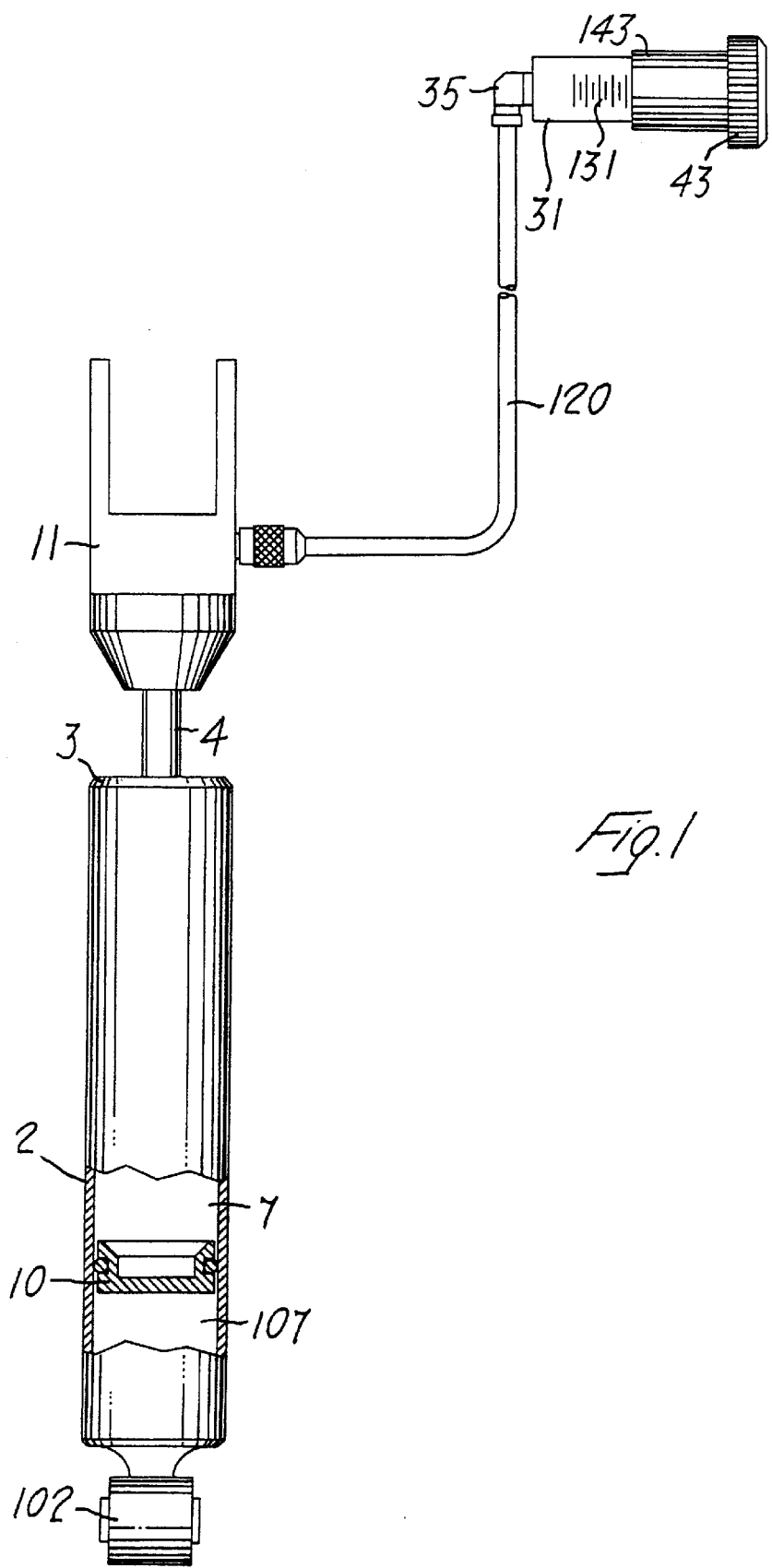
FIG. 1 shows diagrammatically a hydropneumatic shock absorber with parts in section, connected with a device for the remote control of the braking adjustment.
Figure 2:
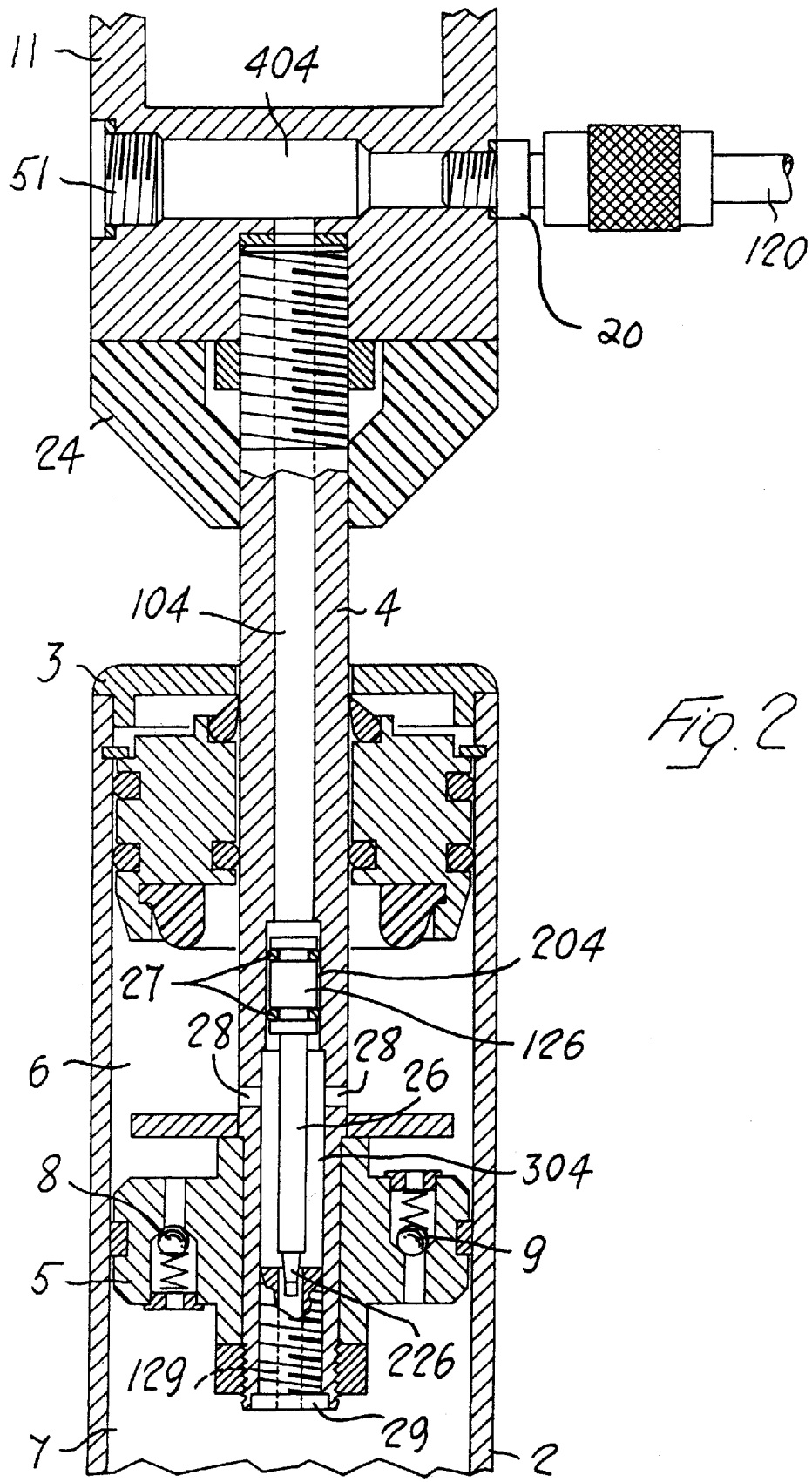
FIG. 2 is a longitudinal section of a portion of the shock absorber according to the invention.

FIGS. 1 and 2 show the hydropneumatic shock absorber 1 featuring a hollow, cylinder or sliding tube 2 with a closed end presenting an attachment 102 to be jointed to one of the parts of the vehicle to be cushioned, while the other end is held closed by a cap 3 through which there passes tightly a stem 4 integral to a piston 5 movable tightly within said sliding tube and defining a first pressure chamber 6 apart from a second pressure chamber 7, both filled with a suitable liquid. Piston 5 is equipped with the single-acting, sized valves 8 and 9 of a standard type which, while the piston is moving, control the flow of the liquid between the two hydraulic chambers 6 and 7 and ensure differentiated braking, as it is usually required during expansion and compression phases of a shock absorber.

The changes in volume of said chambers 6 and 7 caused by the motion of the piston 5 are compensated in a standard way by a floating piston 10 tightly movable within the sliding tube 2 and maintaining the second pressure chamber 7 apart from an adjacent compensating chamber 107 filled with a suitable gas.

In the shock absorber 1 shown in FIG. 1, the end of the stem 4 external to the sliding tube 2 is provided with a suitable terminal attachment member 11 (for example a fork) for fastening to one of the parts of the vehicle which needs cushioning. A rubber bumper 24 is mounted on the stem 4 between the fork means 11 and the cap 3 .

According to the present invention, the stem 4 features for its entire length an axial cavity or duct 104 (see hereinafter) which, on the outer end of said stem, is closed by screwing onto said terminal attachment means 11.

Figure 3:
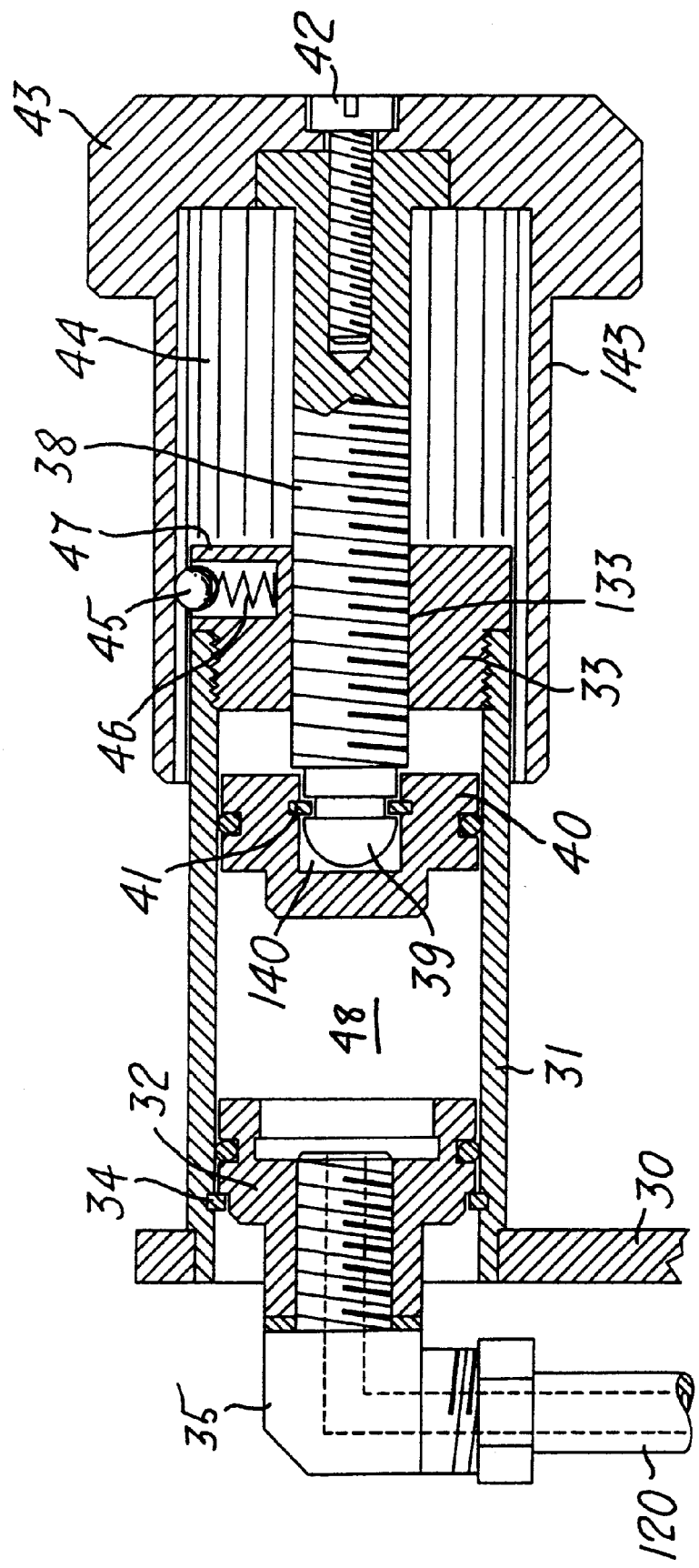
FIG. 3 is a longitudinal section of the remote control device according to the invention.

The said duct 104 communicates through a bore 404 in the attachment member 11, with a flexible tube 120 leading to the remote control device which will be described later in connection with FIG. 3.

According to the present invention, the cavity 104 of the stem 4 features, where proximate to the piston 5, two consecutive enlarged portions 204 and 304 of different diameter, within the first of which, of a smaller diameter, the head 126 of the needle 26 of a variable throttle is engaged, together with its own gaskets 27, to make a sliding side seal with said enlarged portion, and axially and by proper clearance goes through the second enlarged portion 304 which, through radial ports 28, is communicating with the pressure chamber 6 of the shock absorber and lodges, fastened to its end, a bushing 29 with the sized end hole 129 of which the tip 226 of said needle 26 cooperates.

During compression and expansion phases of the shock absorber, the liquid contained in chambers 6 and 7 goes from one chamber to the other not only through the standard valve means 8 and 9 arranged on piston 5 but also through the gap existing between the pin 226 of the needle 26 and the end hole 129 of the bushing 29. According to the present invention, a hydraulic device is provided for remote controlling the size of the said gap of said variable throttle, so that the driver is enabled to adjust the braking force of the shock absorber to the different driving conditions. The remote control, shown in FIG. 3, is fastened to the vehicle in any position easy to reach by the driver by means of a bracket 30. Said control device includes a hollow cylindrical tube or barrel 31, its ends being closed by a screwed cap 33 and by a bell 32 equipped with a side seal gasket and an axial fastening snap ring 34, said bell having an axial threaded hole to which a socket screw 35 is screwed to said bell connected to the end of the tube 120 coming from the stem 4 of the shock absorber.

The cap 33 is axially provided with a threaded hole 133 to which a screw 38 is screwed, which is ended, within the remote control, by a basically hemispherical head 39 lodged with little clearance within the axial and blind seat 140 of a piston 40 engaged within barrel 31 to make a sliding side seal with said barrel. A snap ring 41, lodged by the appropriate annular counter-bores placed on said screw and on the blind seat 140, axially couples the screw 38 to the piston 40. The parts described hereinbefore shall be dimensioned so that the sliding friction between the screw 38 and the piston 40 is substantially restricted to the only contact point between the head 39 and the bottom of the blind seat 140.

A knob 43 with a jacket 143 partly surmounting the barrel 31 is keyed by means of a suitable prismatic connection and is fastened by means of the screw 42 to the end of the screw 38 external to said remote control. Upon the axial motion of the screw 38 and the jacket 143, resulting from the turning of the knob 43, the free edge of said jacket changes its position relatively to a graduated scale 131 placed sideways externally to the barrel 31 to display the size of the adjustment made.

The inner wall of the jacket 143 lodges equally spaced longitudinal teeth 44 cooperating with a ball 45 mounted, being a spring 46 interposed, to a seat 47 lodged radially on a portion of the cap 33 protruding from the barrel 31. The cooperation between the ball 45 and the toothing 44 allows the knob 43 to turn gradually and by steps and locks said knob into the angular position reached time by time.

The pressure chamber 48 formed within the barrel 31 by the piston 40 and the bell 32, the flexible tube 120 and the axial duct or cavity 104 of stem 4 of the shock absorber make a sealed circuit filled with any suitable liquid. The axial motion of the piston 40 within the chamber 48 of the barrel 31 causes a gradual change in volume of said chamber, which correspondingly results in an axial movement of the needle 26 of the throttle and a change in the gap existing between the tip 226 of said needle and the sized end hole 129, so that the braking force of the shock absorber during compression and expansion phases can range as desired.

The stop ring 20 of the flexible tube 120 connecting the cavity 104 of the stem with the remote control shown in FIG.

2 is fastened to one of the ends of a bore 404 transversally cut into the body of the fork 11. The other end of the bore 404 is closed by a cap 51, which is useful during the filling phase of the sealed hydraulic circuit of the remote control device.

We claim:

1. Hydropneumatic shock absorber for vehicles comprising:

a sliding tube sealed at one end, said one end being provided with an attachment for one of two parts of the vehicle which needs cushioning;

a stem presenting at a first end another attachment for the other of said two parts of the vehicle and at a second end a piston engaged within said sliding tube to make a sliding side seal with said tube, said piston being equipped with valve means controlling the flow of a liquid between a first pressure chamber and a second pressure chamber formed within said sliding tube by the opposed faces of said piston, the first pressure chamber being traversed by said stem, said first and second pressure chambers being filled with said liquid to ensure proper braking to the shock absorber during compression and expansion phases;

a floating piston within said second chamber to make a sliding side seal to keep said second chamber apart from a compensating chamber filled with gas, wherein the stem is provided with a longitudinal duct or cavity, said cavity communicating through radial ports with said first chamber and through a sized end hole with the second chamber with which a tip of a needle of a variable throttle cooperates, the other end of said throttle presenting a thickened head engaged within a portion of said duct of said stem to make a sliding seal, said duct being filled with liquid and connected, through an external tube with a remote control having a pressure chamber also filled with liquid, said pressure chamber being of a hydraulic cylinder and piston type having a remote piston;

wherein the longitudinal cavity of the stem terminates at the end lodging the piston by two consecutive enlarged portions of different diameters increasing towards the thickened head of the needle of the variable throttle engaged within the smaller diameter portion to make a sliding side seal with said other portion, while inside the other portion there is fastened a bushing whose inner cavity forms the sized end hole which cooperates with the tip of the needle of the throttle, while the part of said enlarged portion which is free of the bushing is connected through radial bores with the first pressure chamber of the shock absorber;

whereby it is possible by axial displacement of the remote piston in said remote control to change the axial position of said needle of the throttle and therefore also the size or gap of the end hole of said throttle in order to modify the shock absorber braking force.

2. Shock absorber according to claim 1, wherein the end of the duct of the stem opposed to the end carrying the variable throttle device is connected through a flexible tube with the remote control.

3. Shock absorber according to claim 1 wherein the remote control of the variable throttle comprises a barrel fastened to a support of the vehicle, the ends of said barrel being closed by a bell and a cap, said bell being connected through a socket screw to the flexible tube coming from the stem of the shock absorber, said cap being provided with an axial threaded hole to which a screw is screwed which can be operated from outside and having an end internal to the sliding tube that is ended by a hemispherical head axially coupled through a snap ring within the axial, cylindrical and blind seat of the remote piston which engages within said barrel making a sliding side seal with said barrel.

4. Shock absorber according to claim 3 wherein an external end of an adjusting screw of the remote control lodges, fastened to said end, a knob which is integral to a jacket fully enveloping the external side surface of the barrel of said control and whose free edge cooperates with a graduated scale longitudinally resting on the external surface of said barrel in order to display the variations in volume of the pressure chamber of the remote control.

5. Shock absorber according to claim 4 wherein the cap closing the barrel of the remote control protrudes for a certain length from said barrel and lodges on said length a radial seat engaged with a spring and a ball which is pushed by said spring against the inner wall of the jacket of the adjusting knob said inner wall featuring a longitudinal toothing which cooperating with said ball makes the knob turn by steps and blocks said knob in the angular position reached time by time.

6. Hydropneumatic shock absorber for vehicles comprising:

a sliding tube sealed at one end, said one end being provided with an attachment for one of two parts of the vehicle which needs cushioning;

a stem presenting at a first end another attachment for the other of said two parts of the vehicle and at a second end a piston engaged within said sliding tube to make a sliding side seal with said tube, said piston being equipped with valve means controlling the flow of a liquid between a first pressure chamber and a second pressure chamber formed within said sliding tube by the opposed faces of said piston, the first pressure chamber being traversed by said stem, said first and second pressure chambers being filled with said liquid to ensure proper braking to the shock absorber during compression and expansion phases;

a floating piston within said second chamber to make a sliding side seal to keep said second chamber apart from a compensating chamber filled with gas, wherein the stem is provided with a longitudinal duct or cavity, said cavity communicating through radial ports with said first chamber and through a sized end hole with the second chamber with which a tip of a needle of a variable throttle cooperates, the other end of said throttle presenting a thickened head engaged within a portion of said duct of said stem to make a sliding seal, said duct being filled with liquid and connected, through an external tube with a remote control having a pressure chamber also filled with liquid, said pressure chamber being of a hydraulic cylinder and piston type having a remote piston;

wherein the remote control of the variable throttle comprises a barrel fastened to a support of the vehicle, the ends of said barrel being closed by a bell and a cap, said bell being connected through a socket screw to the flexible tube coming from the stem of the shock absorber, said cap being provided with an axial threaded hole to which a screw is screwed which can be operated from outside and having an end internal to the sliding tube that is ended by a hemispherical head axially coupled through a snap ring within the axial, cylindrical and blind seat of the remote piston which engages within said barrel making a sliding side seal with said barrel;

whereby it is possible by axial displacement of the remote piston in said remote control to change the axial position of said needle of the throttle and therefore also the size or gap of the end hole of said throttle in order to modify the shock absorber braking force.

7. Shock absorber according to claim 6, wherein the longitudinal cavity of the stem terminates at the end lodging the piston by two consecutive enlarged portions of different diameters increasing towards the thickened head of the needle of the variable throttle engaged within the portion of smaller diameter to make a sliding side seal with said portion, while inside the other portion there is fastened a bushing whose inner cavity forms the sized end hole which cooperates with the tip of the needle of the throttle, while the part of said enlarged portion which is free of the bushing is connected through radial bores with the first pressure chamber of the shock absorber.

8. Shock absorber according to claim 6, wherein the end of the duct of the stem opposed to the end carrying the variable throttle device is connected through a flexible tube with the remote control.

* * * * *